(12) United States Patent
Guillermin et al.

(10) Patent No.: US 7,004,821 B2
(45) Date of Patent: *Feb. 28, 2006

(54) PROCESS FOR BEVELLING AN OHTHALMIC LENS INCLUDING A PLOTTING STAGE WITHOUT CONTACT

(75) Inventors: Laurent Guillermin, Paris (FR); Sylvaine Millet, Soisy sous Montmorency (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 9 days.

This patent is subject to a terminal disclaimer.

(21) Appl. No.: 10/411,289

(22) Filed: Apr. 11, 2003

(65) Prior Publication Data

US 2003/0220054 A1    Nov. 27, 2003

(30) Foreign Application Priority Data

Apr. 12, 2002  (FR) .................................. 02 04625

(51) Int. Cl.
*B24B 1/00*    (2006.01)
(52) U.S. Cl. ................. 451/43; 451/6; 451/8
(58) Field of Classification Search ............... 451/43, 451/44, 42, 5, 6
See application file for complete search history.

(56) References Cited

U.S. PATENT DOCUMENTS

| | | | |
|---|---|---|---|
| 6,122,063 A | | 9/2000 | Berndt et al. |
| 6,564,111 B1 | * | 5/2003 | Gottschald .................... 451/42 |
| 6,749,377 B1 | * | 6/2004 | Gottschald et al. ........... 451/43 |
| 2002/0041357 A1 | | 4/2002 | Parcy et al. |
| 2003/0224701 A1 | * | 12/2003 | Guillermin et al. ............ 451/5 |
| 2004/0039546 A1 | * | 2/2004 | Guillermin et al. ......... 702/155 |
| 2004/0142642 A1 | * | 7/2004 | Thepot et al. ................ 451/43 |

FOREIGN PATENT DOCUMENTS

EP  1 250 979 A2  10/2002
FR  2 734 505  11/1996

* cited by examiner

*Primary Examiner*—Hadi Shakeri
(74) *Attorney, Agent, or Firm*—Young & Thompson

(57) ABSTRACT

Process for bevelling at least one edge (6) of an optical face (3) of an ophthalmic lens (1), in which the successive curvatures of the optical face (3) are plotted in the vicinity of and along the edge (6) to be bevelled. The edge (6) to be bevelled is scanned with a flat light beam (23) forming a linear light spot (24) on the optical face (3), an image of the light spot (24) is simultaneously formed on optical reception elements (26), the successive curvatures of the optical face (3) in the vicinity of the edge (6) are deduced from the successive positions of this image. This process includes a bevelling stage. Then the lens (1) is rotated about an axis (A1), is brought into contact by its edge (6) with a bevelling tool, and the relative positioning of the lens (1) and of the tool is controlled according to the plots produced.

21 Claims, 6 Drawing Sheets

PROCESS FOR BEVELLING AN OHTHALMIC LENS INCLUDING A PLOTTING STAGE WITHOUT CONTACT

FIELD OF THE INVENTION

The invention relates to the bevelling of ophthalmic lenses.

BACKGROUND OF THE INVENTION

In order to obtain a finished ophthalmic glass suitable for mounting on a spectacle frame, a rough lens presenting a generally cylindrical rim is radially ground following a predetermined contour corresponding to that of the ring of the frame in which the glass is intended to be mounted.

In order to grind the lens, the profile of at least one of its faces is plotted at right angles to the contour to be formed, then the lens, rotated, is brought into contact by its rim with a grinding tool.

Once the grinding operation has been carried out, the lens presents a sharp edge at the junction of its rim and each of its faces.

These are the edges that it is wished to bevel.

In fact, the lens has at its rim a certain thickness, such that, once mounted in the ring of its frame, it protrudes on either side of the latter. It is thus wished to visually soften the junction between the ring of the frame and each of the faces of the lens.

Moreover, taking account of the curvature of the faces of the lens, its edges can prove to be sharp, which is dangerous in itself.

Moreover, a lens that is not bevelled is very fragile at its edges, and it very often happens that small splinters become detached from it, which could injure the wearer and give the lens an unattractive appearance.

In practice, to bevel a lens, the lens is rotated, then a bevelling tool is brought into contact with each of the edges.

Generally, an ophthalmic lens does not display symmetry in revolution but has a certain curvature that is generally compensated for, during the bevelling, by displacing the tool parallel to the rotational axis of the lens during the rotation of the latter.

The quality of a bevel is assessed by measuring its value "across the flat", i.e. the width of the oblique surface thus obtained.

A bevel is said to be of good quality if its value across the flat is constant or approximately constant (variations of the order of 10% which are undetectable to the naked eye can be tolerated) over the whole periphery of the lens.

A bevelling process is known in which a tool is used containing means of compensation permitting a certain elastic deformation of the tool in order to apply it in the most uniform manner possible to the worked glass.

This process, which was made the subject by the applicant of a French patent application published under the number FR-2 811 599, is entirely satisfactory, in particular as regards its economics and the relatively good quality of the bevel that it allows to be obtained at lower cost.

However, while exploring new routes, it is desired to further improve the quality of the bevelling using a more systematic approach.

It is known that, for a constant given angle of bevel, the value across the flat of this bevel depends, at each point, on the curvature of the lens at this point. This can be demonstrated by geometry.

Specifically, a bevelling process is known in which the local curvature of the face of the lens is plotted by means of a mechanical sensor, in the vicinity of the edge to be bevelled and in which, during the bevelling of the lens, the latter is rotated, and the bevelling tool is displaced parallel to the rotational axis of the lens according to the plots produced.

Although this process permits a good-quality bevel to be obtained, it nonetheless presents a certain number of drawbacks, listed below, which it is wished to remedy.

The mechanical force applied by the sensor to the lens engenders, on the sensor or on the lens, stresses and strains which can lead to measurement errors during the plots.

The friction engendered by the sliding of the sensor on the lens during its rotation can produce unattractive scratches on the relevant face of the latter.

This same friction causes chronic wear on the sensor, which, on the one hand, leads to measurement errors during plotting and, on the other hand, necessitates a frequent replacement of the sensor or, in the best of cases, a calibration of the sensor.

Taking account of the curvature of the relevant face of the lens, the reaction of the lens applied to the sensor contains a component perpendicular to the axis of the sensor, which can lead to a bending, or at least an eccentricity of the sensor and, thus, induce not only a measurement error, but also damage to the sensor.

When the sensor is situated, at least locally, next to the rim of the lens, it tends to slide towards the outside of the latter and thus runs the risk of being damaged.

The aggressive machining environment, where water and grinding splinters mix, causes accelerated wear on the sensor which, moreover, is a mechanical assembly which is tricky and costly to realize.

As the sensing is punctiform, it is necessary, in order to obtain the curvature of the lens in the vicinity of the edge to be bevelled, to produce two successive plots at different radii for each face, the curvature being defined, for each point of the edge, by the inclination, with respect to the rotational axis of the lens, of the straight line connecting the two corresponding plotted points.

Two complete turns of the lens are therefore necessary for each of its faces, which increases the cycle time.

SUMMARY OF THE INVENTION

The invention aims to resolve in particular the aforementioned disadvantages, by proposing a process that allows a good-quality bevel to be obtained, in a reliable, rapid and economical manner.

To this end, the invention proposes, according to a first aspect, a process for bevelling at least one edge of an optical face of an ophthalmic lens, which includes a plotting stage in which the successive curvatures of the optical face are plotted in the vicinity of and along the edge to be bevelled, the edge to be bevelled is scanned by means of a flat light beam forming a linear light spot on the optical face, an image of the light spot is simultaneously formed on optical reception means, the successive curvatures of the optical face in the vicinity of the edge are deduced from the successive positions of this image, and which includes a bevelling stage in which the lens, rotated about an axis, is brought into contact by its edge with a bevelling tool, and the relative positioning of the lens and of the tool is controlled according to the plots produced.

As the plots are produced without contact, the lens is preserved from any stress and strain. The scratches on its surface are avoided. The relative positioning of the lens and of the means allowing the plots to be produced is invariable, to the benefit of the accuracy of the measurements.

It is possible to reduce the cycle time, i.e. to increase the rotational speed of the lens during the plotting stage, without affecting the accuracy of the measurements, hence an increased productivity.

Preferably, in the plotting stage, there is selected on the image of the spot a first point, image of the point, called peak, of the illuminated edge, and a second point, image of a point of the optical face, next to the said peak, the curvature of the optical face at the peak is deduced from their respective positions, and the respective coordinates of the peak and of the neighbouring point along the rotational axis of the lens are deduced from the positions of their images on the optical reception means, as well as their respective distances from the axis.

This deduction can be carried out by means of a calculation by triangulation.

In the plotting stage, the curvature of the optical face at the peak can be deduced from the respective coordinates of the peak and of the neighbouring point and from their distances from the axis, by calculating the angle formed by the straight line connecting these two points and the rotational axis of the lens.

Subsequently, in the bevelling stage, between a first and a second successive angular position of the lens, the bevelling tool is then subjected, parallel to the rotational axis of the lens, to a displacement dZ the value of which is provided by the following formula:

$$dZ = (L_2 - L_1) + (Z_2 - Z_1) + \frac{R_2 - R_1}{\sin\beta}$$

where $Z_1$ and $Z_2$ are the coordinates of the peaks corresponding respectively to the first and second angular position of the lens, along the rotational axis of the lens, $R_1$ and $R_2$ are their respective distances from the axis, $\alpha_1$ and $\alpha_2$ are their respective curvatures, $L_1$ and $L_2$ are the depths of cut of the tool at right angles to the peaks.

In a given peak of the edge to be bevelled, the depth of cut can be calculated by means of the following formula:

$$L = C\cos\beta + C\sin\beta\frac{\cos\alpha}{\sin\alpha}$$

where

C is the value across the flat, predetermined, of the bevel to be formed, $\alpha$ is the curvature of the optical face at the peak, $\beta$ is the angle between the cutting edge of the tool and the rotational axis of the lens.

This process can be applied to the bevelling of the two edges of the same lens.

Thus, the lens presenting a front edge on a front face and a rear edge on a rear face, each edge is scanned, in the plotting stage, by means of two flat light beams forming respectively a linear light spot on each of the faces, an image of each light spot is simultaneously formed on optical reception means pointed towards each light spot, and the successive curvatures of the front face in the vicinity of the front edge and those of the rear face in the vicinity of the rear edge are deduced from the successive positions of each image.

According to one embodiment, in the plotting stage, each light beam is activated alternately for each angular position of the lens.

The plots can thus be produced simultaneously on the two faces of the lens.

According to one embodiment, the or both light beam is separated from the rotational axis of the lens.

The or both light beam presents for example a bisector approximately parallel to the rotational axis of the lens.

According to one embodiment, the optical reception means have an optical sight axis forming with the bisector of the light beam a constant sight angle, which is not zero, the value of the sight angle of which is for example between 40° and 50°, preferably equal or approximately equal to 45°.

The light beam and the rotational axis of the lens are, preferably, approximately coplanar.

Moreover, the sight axis forms for example with the bisector of the light beam a plane perpendicular to the plane of the light beam.

Moreover, the light beam is, preferably, coherent, to the benefit of the accuracy of the plots produced. It is for example a laser.

The invention also proposes, according to a second aspect, a machine for bevelling an edge of an optical face of an ophthalmic lens, this machine including a rotary support for the mounting of the lens, a bevelling tool, means for displacing the support and the tool with respect to each other in a direction parallel to the rotational axis of the support, a control unit suitable for controlling said means of displacement, as well as at least one optical measurement device containing a light source producing a flat light beam directed towards said optical face in order to form there a linear light spot crossing the edge to be bevelled, optical reception means pointed towards said light spot and connected to said control unit, the latter including means for calculating the curvature of said face in the vicinity of the edge to be bevelled according to the plots produced on the optical reception means.

In order to allow the bevelling of the two edges of the same lens, the machine can include two optical measurement devices, containing two opposite-facing light sources arranged on either side of the lens, these sources producing two flat light beams directed respectively towards a front face and towards a rear face of the lens in order to form a linear light spot on each of them, optical reception means pointed towards each light spot, the means of calculation being set up to calculate the curvature of each face in the vicinity of each edge to be bevelled.

According to one embodiment, the control unit is set up to activate the light sources alternately.

According to non-limitative particular provisions:
the or both light source is separated from the rotational axis of the support;
the or both light source is set up in order that the bisector of the light beam is approximately parallel to the rotational axis of the support;
the or both light source is set up in order that the light beam which it produces and the rotational axis of the support are approximately coplanar;

According to one embodiment, the optical reception means are set up in order that their sight axis forms with the bisector of the light beam a constant sight angle, which is not zero, the value of which is for example between 40° and 50°, being preferably equal to 45°.

As they are optical reception means, they are for example set up in order that their sight axis is situated in a plane containing the bisector of the light beam and perpendicular to the plane of the light beam; they can contain an objective lens the optical axis of which is coincident with the sight axis as well as a screen which is cut by the sight axis and on which the image of said light spot forms.

Moreover, the light source is preferably set up to produce a coherent light beam. It is for example a laser.

BRIEF DESCRIPTION OF THE DRAWINGS

Other characteristics and advantages of the invention will emerge from the following description of one embodiment given by way of non-limitative example, this description referring to the attached drawings in which.

DETAILED DESCRIPTION OF THE INVENTION

Figure 1:
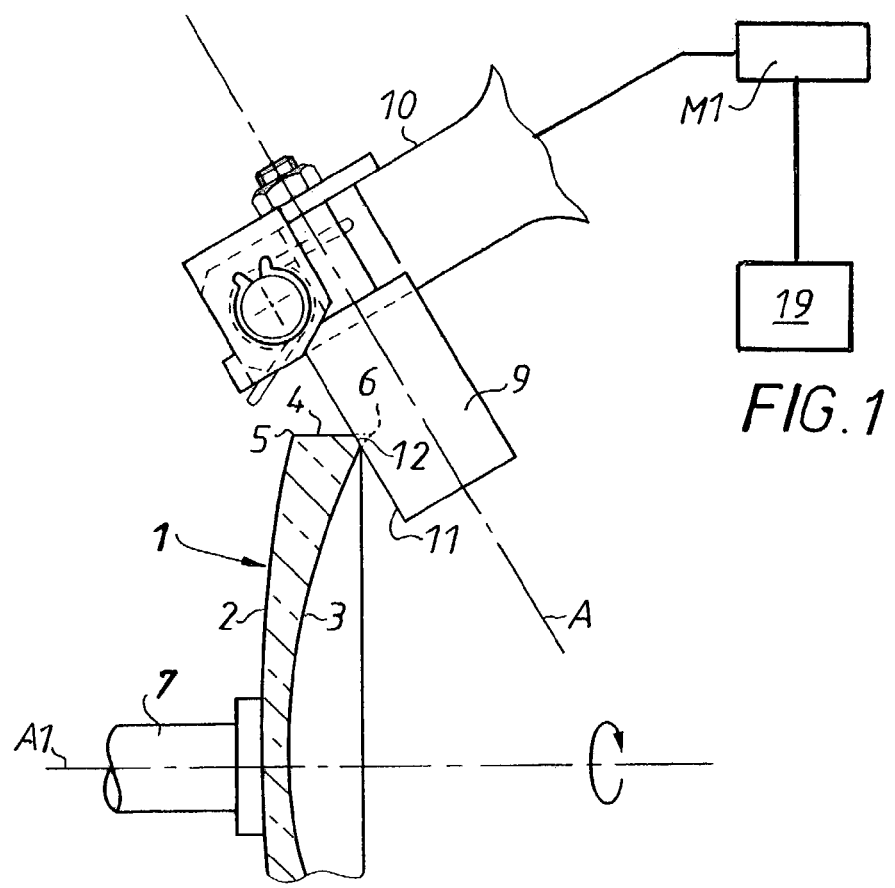
FIG. 1 is a view in partial section of a lens, mounted on a rotary support shaft, represented during a bevelling operation on its rear edge.

An ophthalmic lens 1 is represented in FIG. 1 which presents two optical surfaces constituted respectively by opposite faces designated front face 2 and rear face 3, connected by a rim 4 which is initially cylindrical with a circular profile, but which, after an operation of grinding the lens 1, presents a contour corresponding to that of a ring of a spectacle frame in which this lens 1 is intended to be mounted.

After this grinding operation, the lens 1 presents, at the junction of its rim 4 and its front face 2, a front edge 5 and, at the junction of its rim 4 and its rear face 3, a rear edge 6, the front edge 5 and the rear edge 6 constituting sharp edges that it is desired to smooth by a bevelling operation.

The lens 1 is fixed by at least one of its faces 2, 3 on a support shaft 7 mounted rotating about an axis A1 with respect to the frame of a machining device 8. The lens 1 is positioned on the support shaft 7 in such a way that, in any section plane containing the axis A1, the rim 4 is parallel to the axis A1.

The bevelling operation is carried out using an abrasive grinding machine 9 mounted on a support 10 that is mobile at least in translation, using a motor M1, with respect to the frame of the machine 8, parallel to the axis A1.

Moreover, the grinding machine 9 has a symmetry of revolution with respect to an axis A about which it is rotated and which is inclined with respect to the axis A1.

During the bevelling, the grinding machine 9 comes into contact with the lens 1 by a cutting edge 11 inclined with respect to the axis A1 and forming with the latter a predetermined angle $\beta$ which, in this case, is identical to that formed by the axis A of the grinding machine 9 with the axis A1 since, taking account of the cylindrical geometry of the grinding machine 9, the cutting edge 11 is parallel to the axis A of the grinding machine 9.

During the bevelling, the angle $\beta$ is kept constant, while the cutting tool 9 is displaced in translation parallel to the axis A1 in order to realize starting from the edge concerned (in the embodiment represented in FIG. 1, this is the rear edge 6) a bevel 12 of which the value across the flat, designated C, is equal to a predetermined, constant, value over the whole periphery of the lens 1, despite the variations in curvature of the latter.

Figure 2:
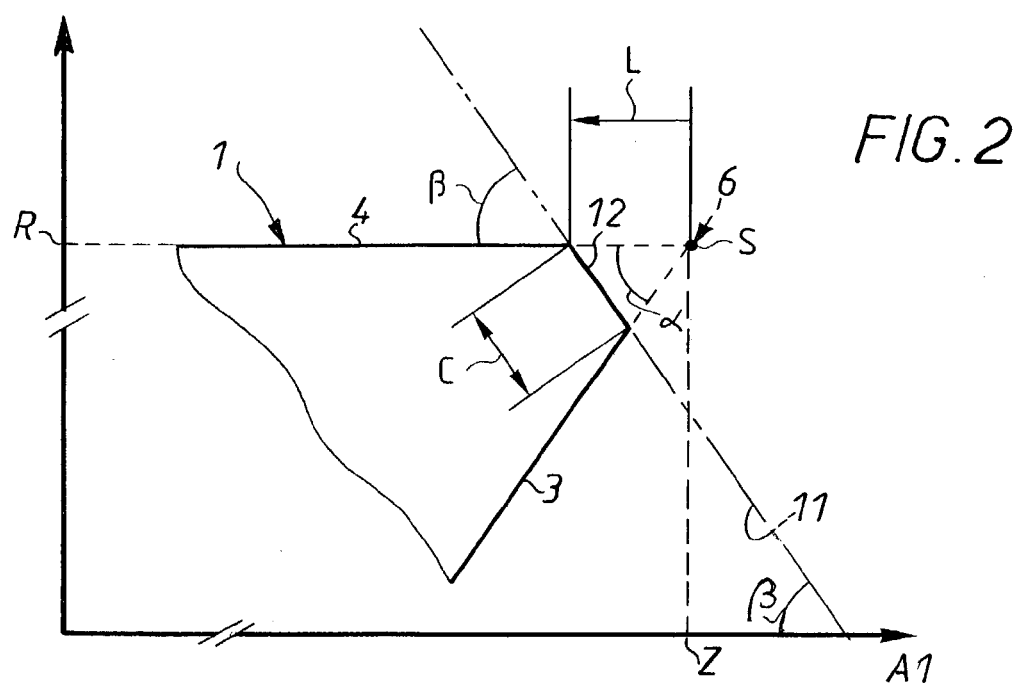
FIG. 2 is a schematic detailed sectional view of a lens in the vicinity of one of its edges, in this case the rear edge, on which are represented, by dashed lines, the machined part of the lens and, by a continuous line, a bevel realized starting from the edge by means of a bevelling tool the cutting edge of which is represented by a dash-dotted line.
Figure 3:
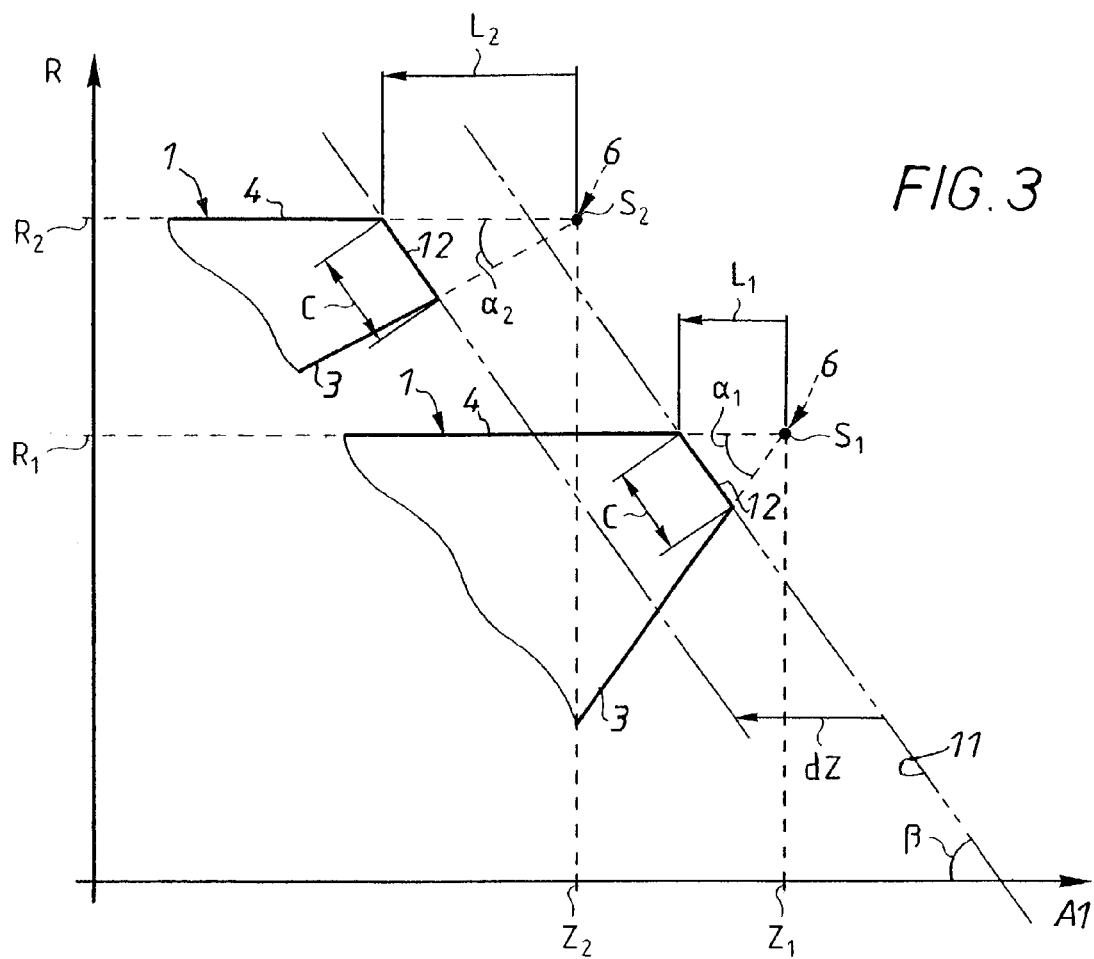
FIG. 3 is a schematic detailed sectional view, analogous to FIG. 2, in which are represented two portions of the same lens, offset in an angular manner, but shown in the same section plane coincident with the plane of the figure.
Figure 5:
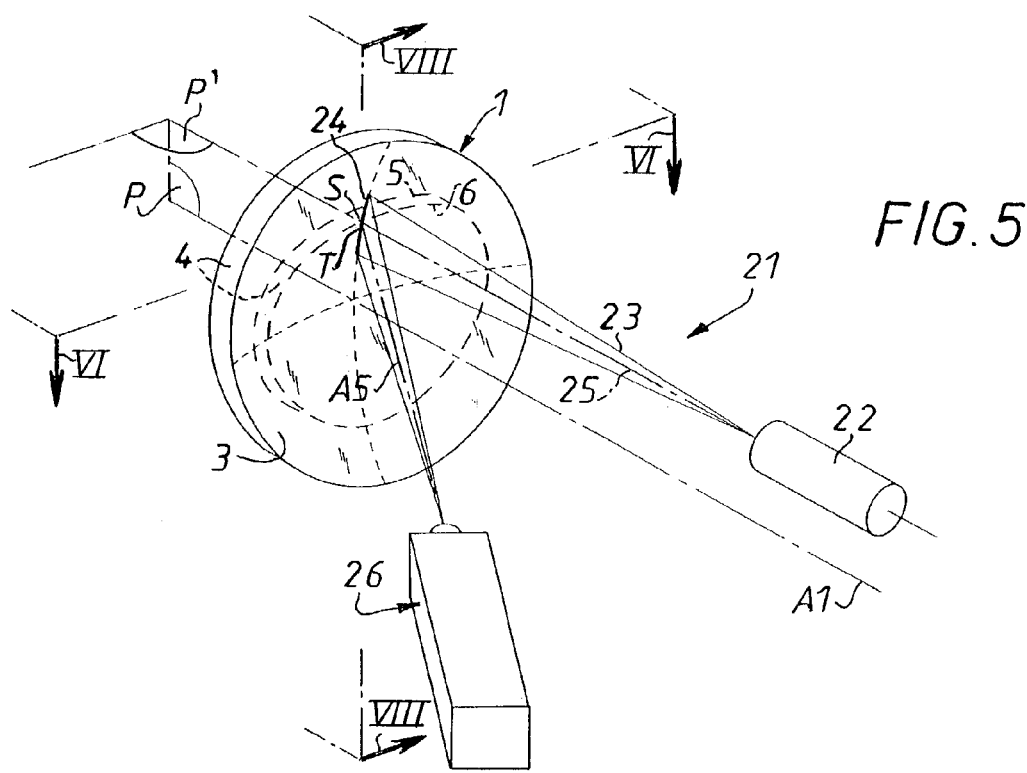
FIG. 5 is a detailed perspective view of a rough lens and of one of the optical measurement devices of FIG. 4.

By "value across the flat" is meant the width of the bevel 12 (FIG. 2).

For each current point, called peak and designated S, of the edge 5, 6 that it is desired to bevel, the following are designated:

Z its coordinate along the axis A1 oriented in the direction of the normal with respect to the relevant face 2, 3 of the lens 1 (in FIG. 2, this is the rear face 3), R its distance from the axis A1, $\alpha$ the local curvature of the lens 1 at the peak S, i.e. the angle, in the plane formed by the axis A1 and the peak S (in FIG. 2, this plane is coincident with the plane of the page), between the rim 4 and the tangent at peak S to the face 2, 3 of the lens 1, L the depth of cut of the tool 9 at right angles to the peak S, i.e. the depth of material, measured along the oriented axis A1, that it is necessary to remove starting from the peak S in order to obtain a bevel 12 which has the desired value across the flat C.

The value of the depth of cut L can be calculated by the following formula:

$$L = C\cos\beta + C\sin\beta \frac{\cos\alpha}{\sin\alpha}$$

Let $S_1$ and $S_2$ be two successive peaks, offset at an angle, of the same edge 5, 6 to be bevelled. There are designated, respectively:

$Z_1$ and $Z_2$ their coordinates along the oriented axis A1,
$R_1$ and $R_2$ their distances from the axis A1,
$\alpha_1$ and $\alpha_2$ their curvatures and,
$L_1$ and $L_2$ their depths of pass.

As soon as these values are known, it is possible to deduce from them the displacement dZ to which the grinding machine 9 must be subjected parallel to the axis A1 in order that the value across the flat C of the bevel 12 is identical at right angles to each peak $S_1$, $S_2$, being equal to the predetermined value.

The value of this displacement dZ can in fact be calculated by the following formula:

$$dZ = (L_2 - L_1) + (Z_2 - Z_1) + \frac{R_2 - R_1}{\sin \beta}$$

Repeating this calculation at each moment, for each angular position of the lens 1, and displacing the tool 9 according to the calculated value dZ, a bevel 12 is obtained of which the value across the flat C is constant over the whole periphery of the lens 1.

The value of the inclination β of the cutting edge 11 and the value across the flat C of the bevel 12 are predetermined values, chosen according to the appearance that it is wished to give to the lens 1.

It therefore remains to obtain, for each peak S of the edge 5, 6 to be bevelled:
the value of its coordinate Z along the axis A1,
the value of its distance R from the axis A1 and,
the value of its curvature α.

As we shall see, these values are measured during a plot produced without contact which can be carried out within the actual machining device 8, which will now be described.

This machine 8 contains two opposite-facing support shafts 7, 7', between which the lens 1 is held by gripping. These support shafts 7, 7' are conjointly rotated about their common axis A1.

The support shafts 7, 7' are mounted on a mobile support 13 mounted pivoting on the frame of the machine 8, about a second axis A2 parallel to the first axis A1. Taking account of these kinematics, the support 13 is called rocker in the remainder of the description.

The machine 8 moreover contains a bar 14 with articulated mounting, on the one hand, by a first extremity 15, to the frame about the second axis A2 of the rocker 13 and, on the other hand, by a second extremity 16 about a third axis A3 parallel to the previous ones A1, A2, to a collar 17 itself mounted mobile in translation along a fourth axis A4, commonly called restitution axis, perpendicular to the axes A1 to A3.

The collar 17 is internally threaded; it is held by screwing on a threaded rod 18 extended along the fourth axis A4 about which it is rotated, by means of a motor M2.

Such a machine 8 is, for the parts 7, 7', 13 to 18, M2 which have just been described, well known to a person skilled in the art as it is very widespread in the trade and has been made the subject, by the Applicant, of numerous patents.

Reference may be made in particular to the French patent application published under the number FR-A-2 734 505.

In numerous current applications of such a machine 8, in particular for grinding, the rocker 13 and the bar 14 are mobile with respect to each other. Here, it is assumed however that these two pieces are integral.

The machine 8, which in practice is a digitally controlled machine, also contains a control unit 19 suitable for coordinating the operations which have just been described. This control unit is in particular connected to the motors M1 and M2 that it controls.

Here, the machine 8 also includes, for the aforementioned plots to be produced on the front edge 5 of the lens 1, a first optical measurement device 20 and, for the plots to be produced on the rear edge 6, a second optical measurement device 21.

These devices 20, 21 are arranged on either side of the lens 1, each containing a light source 22, fixed to the frame of the machine 8 and arranged opposite one of the faces 2, 3 of the lens 1.

This light source 22 produces a flat light beam 23 directed towards this face 2, 3 of the lens 1 in order to form a linear light spot 24 there.

The visibility of this spot 24 results from a diffusion phenomenon upon impact of the beam on the face 2, 3 which in fact presents a certain roughness.

Figure 6:
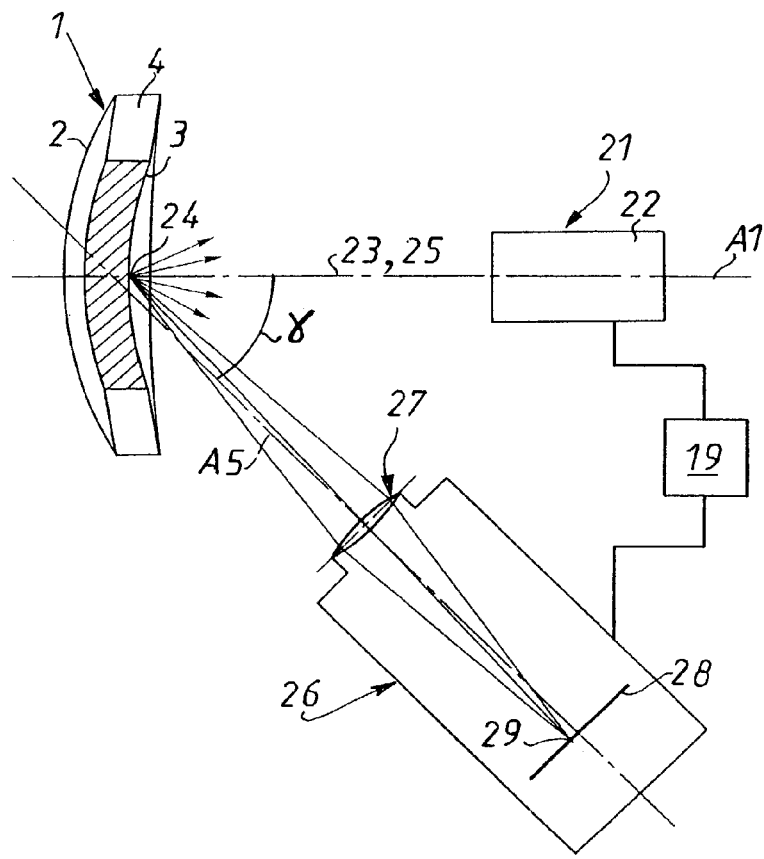
FIG. 6 is a view from above in partial section of the lens and of the measurement device of FIG. 5, along a section plane produced in this figure by the plane VI—VI.

This diffusion phenomenon is illustrated in FIG. 6 by concentric arrows, which represent the diffused light.

This light source 22 is preferably a laser, chosen for its accuracy, the light beam 23 produced then being coherent.

The light source 22 is arranged in order that the beam 23 is at one and the same time separated from the rotational axis A1 of the support shafts 7, 7' and in order that its bisector 25 is parallel to the axis A1, in such a way that the beam 23 and the axis A1 jointly form a plane designated P, coincident with the plane of the beam 23.

Each optical measurement device 20, 21 also contains optical reception means, in the form of a camera 26 fitted with an objective lens 27 and a photosensitive screen 28.

Figure 9:
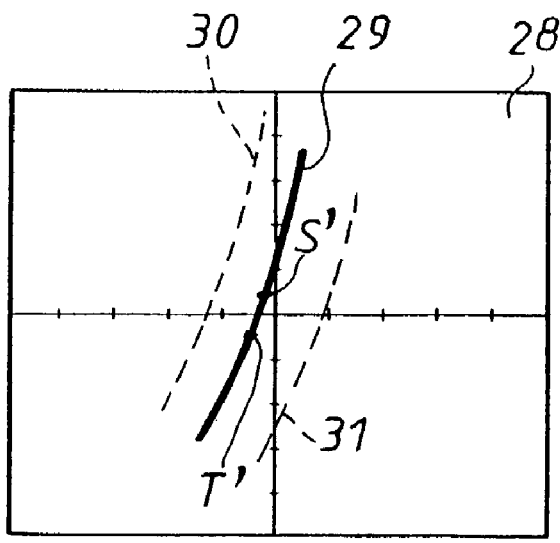
FIG. 9 is a schematic view illustrating the screen of the optical reception device of FIG. 6, on which are represented, in the form of curved lines, several images of the light spot formed on the illuminated face of the lens.
Figure 10:
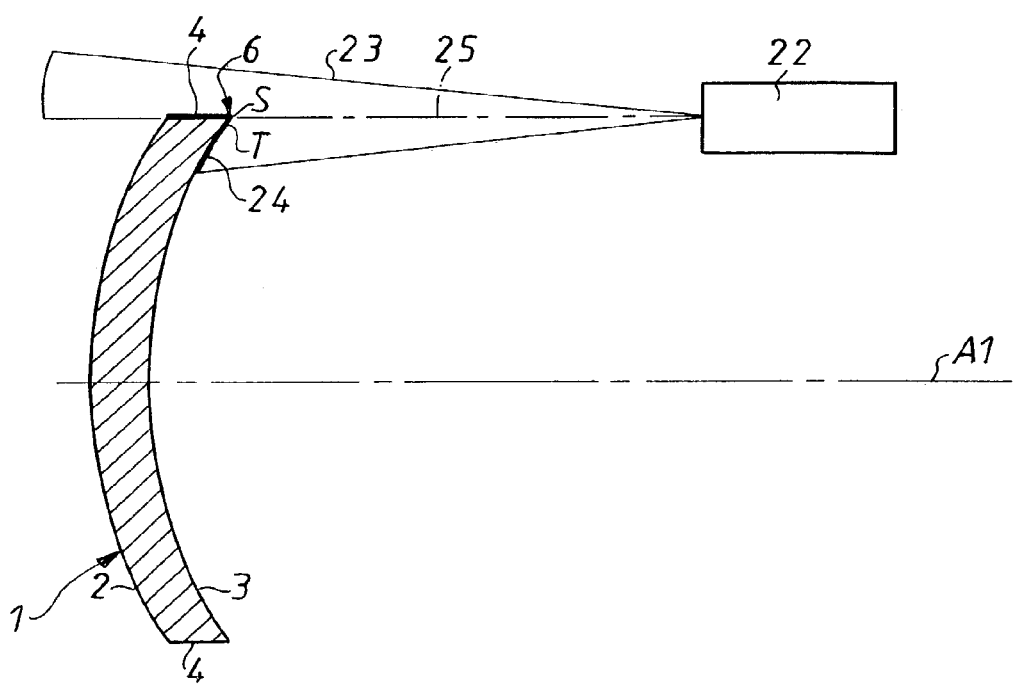
FIG. 10 is a view analogous to FIG. 8, according to another embodiment where the lens has been previously ground.

The camera 26 is pointed towards the light spot 24. More precisely, this camera 26 has a sight axis A5, coincident with the optical axis of its objective lens 27, which cuts the light beam 23 on its bisector 25 in the vicinity of the light spot 24, in such a way that a linear image 29 of the latter forms on the screen 28 (FIG. 9).

The camera 26 is oriented, on the one hand, in order that its sight axis A5 forms, together with the bisector 25 of the light beam 23 a plane, designated P', perpendicular to the plane P.

It is oriented on the other hand in order that its sight axis A5 forms with the bisector 25 of the light beam 26 an angle γ, called sight angle, constant, which is not zero.

The value of this sight angle γ is for example between 40° and 50°. Preferably, the value of the sight angle γ is approximately equal to 45°.

According to a first embodiment, the aforementioned plots are produced before the grinding of the lens 1. The procedure is as follows.

The rough lens 1 is positioned by a pivoting of the rocker 13 until the light spot 24 is coincident with the edge 5, 6 to be formed, the projection of which onto a plane perpendicular to the rotational axis A1 of the lens 1 is already known, this projection having in fact been stored in the control unit 19 during the plotting of the contour of the ring of the frame.

The movement of the rocker 13 is controlled by the control unit 19: the latter in fact controls the motor M2 the rotation of which leads, via the collar 17 which follows a translation movement along the axis A4, to the pivoting of the bar 14 about the axis A2.

The lens 1 is then rotated, via the shafts 7, 7', about its axis A1, the control unit 19 simultaneously and continuously controlling the pivoting of the rocker 13 in order that the light spot 24 scans the whole of the edge 5, 6 to be formed, the bisector 25 of the beam 23 coinciding with it at each moment, so that the spot 24 is permanently centred on the edge 5, 6.

Moreover, taking account of the curvature of the illuminated face 2, 3, the light spot 24 moves, during the rotation of the lens 1, parallel to the rotational axis A1, following a path between two limiting return lines the images 30, 31 of which are represented by dashed lines in FIG. 9, the average distance separating these two lines being called depth of field.

Conjointly, the linear image 29 of the light spot 24 moves on the screen 28 following, between the images 30 and 31, a path which is the projection onto the screen 28 of the path followed by the light spot 24.

Of course, the size of the screen 28 and the distance from the lens 1 at which the camera 26 is situated are chosen according to the depth of field in order that the image 29 of the light spot 24 never leaves the screen 28.

Generally, the depth of field is known in advance, so that it is possible to preset the screen 28.

A displacement of the light spot 24 over a distance dl along its path causes a proportional displacement of its image 29, along its own path, over a distance dl'

The successive positions of each point of the image 29 on the screen 28 are plotted at every moment, for each angular position of the lens 1.

Known solutions allow such a plot to be produced. Thus, the screen 28 can be constituted by a CCD-type matrix optical sensor, the images 29 which form there then being the subject of a standard digital processing.

Here, the wavelength of the emitted beam 23 and the range of the wavelengths that can be transmitted by the material of the lens 1 are chosen so as to be incompatible.

The material of the lens 1 allows certain UV rays to pass and more generally any beam of a minimum wavelength of 325 nm. A light source the wavelength of which is less than this value will behave, vis-á-vis any lens 1, as if the latter was opaque. A UV diode or a UV laser diode UV can, to this end, be advantageously employed as light source so as to be able to suppress any secondary images of the beam 23 forming on the optical reception means 26, these images also forming from the image reflected directly by the first encountered surface of the lens, which is necessary for implementing the invention.

These secondary images may result from the fact that, when the emitted beam 23 is transmissible by the lens 1, the whole intensity of the beam 23 is not entirely reflected by the first surface encountered. A residual beam can be diffused in the inside of the glass, at an angle of refraction, encounter the face opposite to the incident face and then be reflected as a secondary image in the direction of the optical reception means 26. Other secondary images can also be formed by the multiple reflections of the beam 23 between the faces of the glass, along paths confined to the thickness of the lens 1.

Figure 7:
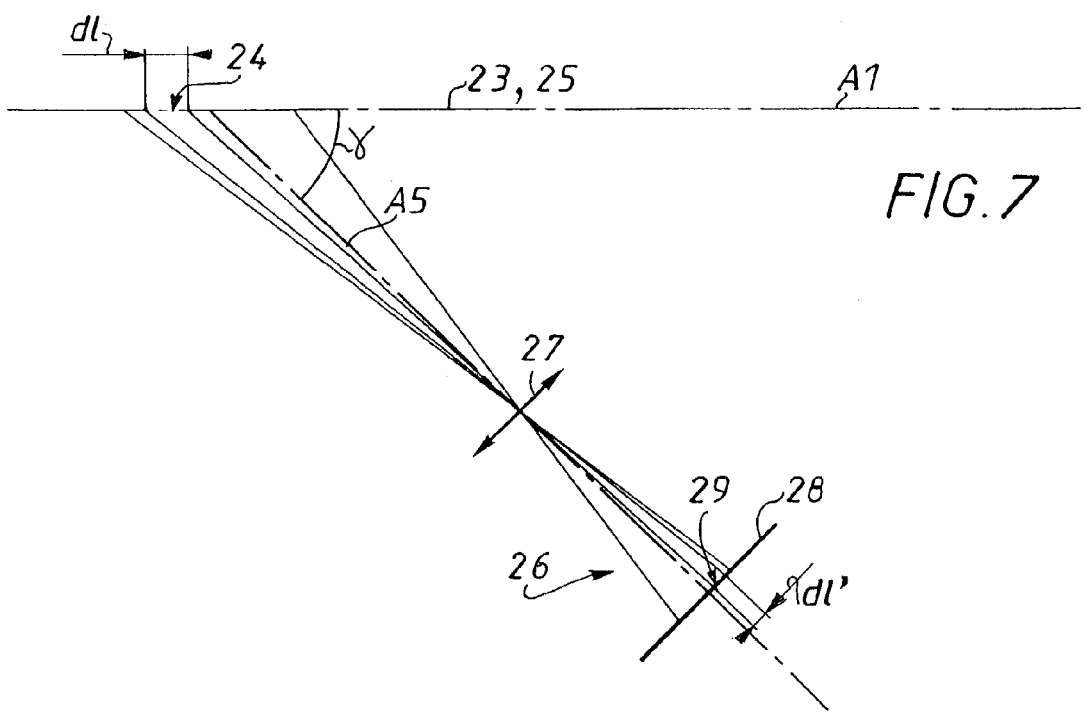
FIG. 7 is a diagram illustrating, in plan view, the illumination axis of the light source of FIGS. 5 and 6 as well as the objective lens of the optical reception device and its screen.
Figure 8:
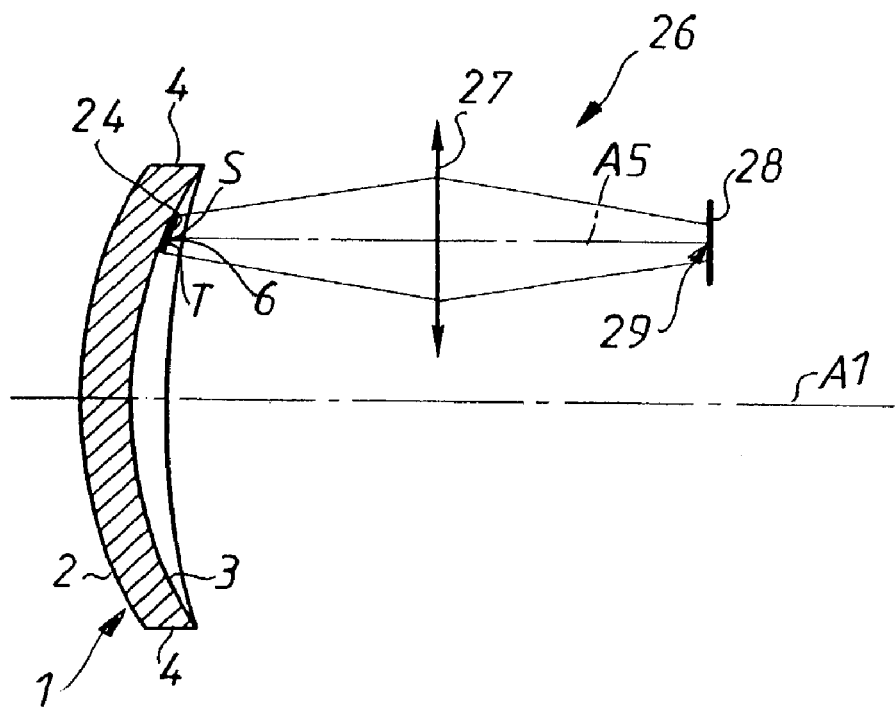
FIG. 8 is a sectional view of the lens of FIG. 5, along the section plane VIII—VIII; the optical measurement device is also represented, schematically.

According to an embodiment illustrated in FIG. 7, the screen 28 extends in a plane perpendicular to the sight axis A5, but it can also be inclined with respect to the latter in order to form a non-right angle, for example of approximately 45°.

A simple averaging calculation permits the selection of an intermediate point S' on the image 29, which corresponds to the current peak S, intersection of the spot 24 with the edge 5, 6 to be formed.

For each S' image point of the peak S, a selection is also made, conjointly, on the image 29, of a second point T' which corresponds, on the illuminated face 2, 3 of the lens 1, to a point T of the light spot 24 and which, offset with respect to the edge 5, 6 towards the centre of the lens 1, is at a small distance from the latter, i.e. at a distance the value of which is of less than 2 mm, preferably less than or equal to 1 mm.

Triangulation is used to calculate, from the coordinates of their images on the screen 28, the respective coordinates of these two real points S and T along the axis A1, as well as their respective distances from this axis.

The angle formed by the straight line connecting these two real points S, T with the axis A1 is then calculated, this angle being equal to the curvature α of the illuminated face 2, 3 of the lens at the peak S.

The control unit 19 contains a calculator set up to perform the calculations presented above, and in which in particular the formulae providing the depth of cut L and the displacement dZ have been programmed.

The results of the calculations are stored, for each angular position of the lens 1, in the control unit 19, in such a way that following a complete revolution of the lens 1, there is stored in the control unit 19 a set of data forming a digital modelling of the three-dimensional shape of the edge 5, 6 to be formed with, for each point S of the edge 5, 6, the corresponding curvature α of the face 2, 3 of the lens 1.

Figure 4:
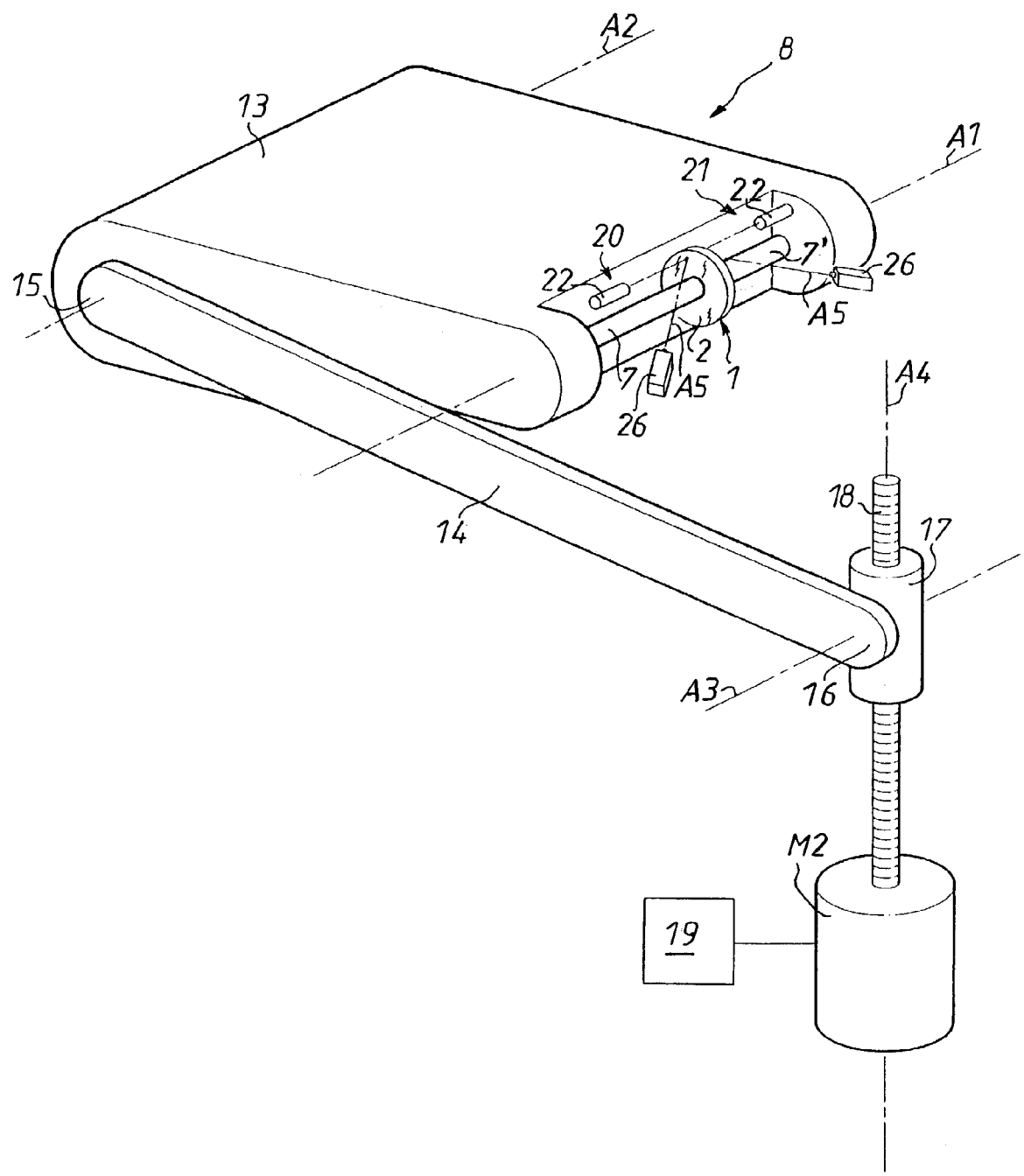
FIG. 4 is a partial perspective view of a machining device, which contains a rotary support for the mounting of a lens, and two measurement devices each formed of a light source and an optical reception device, arranged on either side of the lens.

According to an embodiment illustrated in FIG. 4, the optical measurement devices 20, 21 are arranged symmetrically with respect to the lens 1, in such a way that their light sources 22 are situated one opposite the other, the beams that they produce being coplanar.

In order to obtain a plot of the front edge 5 and of the rear edge 6 and of their respective curvatures α, at least two different procedures are possible.

On the one hand, it is possible to carry out a first complete revolution of the lens 1, during which one of the sources 22 is activated in order to produce the plots on one of the edges 5, 6, then a second complete revolution, during which the other light source 22 is activated in order to produce the plots on the other edge 5, 6.

On the other hand, as a variant, it is possible to carry out a single complete revolution of the lens 1, during which, for each angular position of the latter, each of the two light sources 22 is activated alternately in order to produce the plots simultaneously on the two edges 5, 6 without the light source 22 of the first measurement device 20 disturbing, by a refraction phenomenon, the plots produced by the second device 21, and vice versa.

In concrete terms, these alternating activations manifest themselves in flashes in phase opposition of the two light sources 22.

The process which has just been described allows, as we have seen, the production of the plots on the notional front edges 5 and rear edges 6, since these have not yet been obtained, the lens 1 being rough.

But, according to a second embodiment, this process can be adapted, by means of some minor modifications, to the plots on the real front edges 5 and rear edges 6, after the lens 1 has been ground.

It is thus not necessary to control the movements of the rocker 13 according to the plotted shape of the circle of the frame.

It is enough to rotate the ground lens 1, about its axis A1, and to illuminate the face 2, 3 of the lens 1, ensuring that the light spot 24 always covers the formed edge 5, 6, whatever the angular position of the lens 1.

Figure 11:
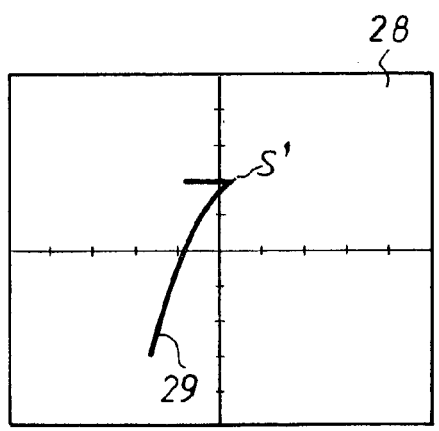
FIG. 11 is a view analogous to FIG. 9 in which the image of the spot formed on the previously ground lens of FIG. 10 appears.

There is then obtained on the screen 28 a fractured image presenting a return point which is the image S' of the current peak S (FIG. 11).

The following operations, namely:
the selection of the image T' of the neighbouring point T,
the calculation of the coordinates of the real points S and T,
the calculation of the curvature at the peak S, are carried out as previously described for the first embodiment.

Whatever the embodiment chosen, the optical measurements which have just been described present a clearly greater accuracy than the standard mechanical measurements, to the benefit of the accuracy of bevelling.

Moreover, it has been seen that it is possible to produce the plots in a single lens revolution for each face, indeed for the two faces simultaneously.

The result is a reduction in cycle times, to the benefit of productivity.

Moreover, the use of a flat light beam is particularly advantageous, since if the presence of impurities on the path of the beam causes breaks in the image 29, it is possible to restore a continuous image using a simple interpolation calculation.

The invention claimed is:

1. Process for bevelling at least one edge (5, 6) of an optical face (2, 3) of an ophthalmic lens (1), which includes a plotting stage in which the successive curvatures ($\alpha$) of the optical face (2, 3) are plotted in the vicinity of and along the edge (5, 6) to be bevelled, characterized in that, in the plotting stage, the edge (5, 6) to be bevelled is scanned using an optical measurement device providing a flat light beam (23) forming a linear light spot (24) on the optical face (2, 3), an image (29) of the light spot (24) is simultaneously formed on optical reception means (26), the successive curvatures ($\alpha$) of the optical face (2, 3) are deduced by means for calculating the curvature of said face in the vicinity of the edge (5, 6) from the successive positions of this image (29), and in that it includes a bevelling stage in which the lens (1), mounted on a rotary support to be rotated about an axis (A1), is brought into contact by its edge (5, 6) with a bevelling tool (9) by means for moving the rotary support, and the relative positioning of the lens (1) and of the tool (9) is controlled by a control unit according to the plots produced.

2. Process according to claim 1 characterized in that, in the plotting stage, there is selected on the image (29) of the spot a first point (S'), image of the point (S), called peak, of the illuminated edge (5, 6), and a second point (T'), image of a point (T) of the optical face (2, 3), next to said peak (S), and the curvature ($\alpha$) of the optical face (2, 3) at the peak (S) is deduced from their respective positions.

3. Process according to claim 2, characterized in that, in the plotting stage, the respective coordinates of the peak (S) and of the neighbouring point (T) along the rotational axis (A1) of the lens (1) are deduced from the positions of their images (S', T') on the optical reception means (28), as well as their respective distances from the axis (A1).

4. Process according to claim 3, characterized in that said deduction is carried out using a calculation by triangulation.

5. Process according to claim 3, characterized in that, in the plotting stage, the curvature ($\alpha$) of the optical face (2, 3) at the peak (S) is deduced from the respective coordinates of the peak (S) and of the neighbouring point (T) and from their distances from the axis (A1), by calculating the angle formed by the straight line connecting these two points (S, T) and the rotational axis (A1) of the lens (1).

6. Process according to claim 5, characterized in that, in the bevelling stage, between a first and a second successive angular position of the lens (1), the bevelling tool (9) is subjected, parallel to the rotational axis (A1) of the lens (1), to a displacement dZ the value of which is provided by the following formula:

$$dZ = (L_2 - L_1) + (Z_2 - Z_1) + \frac{R_2 - R_1}{\sin\beta}$$

where $Z_1$ and $Z_2$ are the coordinates of the peaks ($S_1$, $S_2$) corresponding respectively to the first and second angular positions of the lens (1), along the rotational axis (A1) of the lens (1), $R_1$ and $R_2$ are their respective distances from the axis (A1), $\alpha_1$ and $\alpha_2$ are their respective curvatures, $L_1$ and $L_2$ are the depths of cut of the tool (9) at right angles to the peaks ($S_1$, $S_2$).

7. Process according to claim 6, characterized in that, in a given peak (S) of the edge (5, 6) to be bevelled, the depth of cut (L) is calculated by means of the following formula:

$$L = C\cos\beta + C\sin\beta\frac{\cos\alpha}{\sin\alpha}$$

where

C is the value across the flat, predetermined, of the bevel (12) to be formed, $\alpha$ is the curvature of the optical face (2, 3) at the peak (S), $\beta$ is the angle between the cutting edge (11) of the tool (9) and the rotational axis (A1) of the lens (1).

8. Process according to one of claim 1, characterized in that, the lens (1) presenting a front edge (5) on a front face (2) and a rear edge (6) on a rear face (3), each edge (5, 6) is scanned, in the plotting stage, using two flat light beams (23) forming respectively a linear light spot (24) on each of the faces (2, 3), there is formed simultaneously, on optical reception means (28) pointed towards each light spot (24), an image (29) of the latter, and the successive curvatures of the front face (2) in the vicinity of the front edge (5) and those of the rear face (3) in the vicinity of the rear edge (6) are deduced from the successive positions of each image (29).

9. Process according to claim 8, characterized in that, in the plotting stage, each light beam (23) is activated alternately for each angular position of the lens (1).

10. Process according to claim 1, characterized in that the light beam (23) is separated from the rotational axis (A1) of the lens (1).

11. Process according to claim 10, characterized in that said light beam (23) presents a bisector (25) approximately parallel to the rotational axis (A1) of the lens (1).

12. Process according to claim 10, characterized in that the optical reception means (28) has an optical sight axis (A5) forming with a bisector (25) of the light beam (23) a constant sight angle ($\gamma$), which is not zero.

13. Process according to claim 1, characterized in that the light beam (23) and the rotational axis (A1) of the lens (1) are approximately coplanar.

14. Process according to claim 13, characterized in that the value of the sight angle ($\gamma$) is between 40° and 50°.

15. Process according to claim 14, characterized in that the value of the sight angle ($\gamma$) is approximately equal to 45°.

16. Process according to claim 13, characterized in that the sight axis (A5) forms with the bisector (25) of the light beam (23) a plane (P') perpendicular to the plane (P) of the light beam (23).

17. Process according to claim 1, characterized in that said light beam (23) is coherent.

18. Process according to claim 17, characterized in that said light beam (23) is a laser.

19. Process according to claim 1, characterized in that the wavelength of the light beam (23) has a value which is less than the minimum wavelength that can pass through the material of the ophthalmic lens (1).

20. Process according to claim 1, characterized in that the wavelength of the light beam (23) has a value of less than 325 nm.

21. Process according to claim 19, characterized in that the light beam (23) originates from a UV diode.

* * * * *